(12) United States Patent
Wright

(10) Patent No.: US 7,165,358 B2
(45) Date of Patent: Jan. 23, 2007

(54) CHIPPED WOOD AS A SUBSTRATE FOR PLANT GROWTH

(75) Inventor: Robert D. Wright, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 11/024,441

(22) Filed: Dec. 30, 2004

(65) Prior Publication Data
US 2006/0112629 A1    Jun. 1, 2006

Related U.S. Application Data

(60) Provisional application No. 60/628,776, filed on Nov. 18, 2004.

(51) Int. Cl.
A01G 17/00 (2006.01)
B27L 11/00 (2006.01)

(52) U.S. Cl. ............................................. 47/58.1 FV
(58) Field of Classification Search ............... 47/58.1, 47/1.01 R; 71/23
See application file for complete search history.

(56) References Cited

U.S. PATENT DOCUMENTS

| | | | | |
|---|---|---|---|---|
| 2,901,339 | A | * | 8/1959 | Boomer et al. ............... 71/23 |
| 4,250,662 | A | * | 2/1981 | Rees et al. .................... 47/9 |
| 2001/0022047 | A1 | * | 9/2001 | Krysiak et al. ............. 47/58.1 |

FOREIGN PATENT DOCUMENTS

| | | | | |
|---|---|---|---|---|
| DE | 4130468 | A | * | 9/1992 |
| JP | 04126016 | A | * | 4/1992 |
| JP | 407059461 | A | * | 3/1995 |
| JP | 02003143969 | A | * | 5/2003 |

OTHER PUBLICATIONS

Bark King; The Garden Mulch People; Red Gum Mulch; http://www.barkking.com.au/index.php?location=2&product-8.*
AMINPRO; Mesh Screen Sizes; http://www.aminpro.com/pages_english/screen.asp.*
Cole, DM and JL Sibley, "Waste Not, Want Not", *American Nurseryman* 200(9):44-47, Nov. 1, 2004.
Conover, CA and RT Poole, "Utilization of Melaleuca quinquenervia as a Potting Medium Component for Greenhouse Production of Foliage Plants", *HortScience* 18(6):886-888, 1983.
Ehert, DL et al., "Clay Addition to Siolless Media Promotes Growth and Yield of Greenhouse Crops", *HortScience* 33(1):67-70, 1998.
Lunt, O and B Clark, "Horticultural Applications for Bark and Wood Fragments", *Forest Products Journal* 9:39a-42a, 1959.
Mass, EF and RM Adamson, "Artificial media in horticulture—their formulation and fertilization", Agriculture Canada Publication No. 1726/E, originally published 1981, electronic revision Apr. 22, 2002.
Poole, RT and CA Conover, "Growth of Ficus benjamina in Combinations fo Peat, Sand, and Melaleuca", *HortScience* 20(3):383-385, 1985.

* cited by examiner

*Primary Examiner*—Francis T. Palo
(74) *Attorney, Agent, or Firm*—Latimer IP Law, LLP

(57) ABSTRACT

The present invention provides compositions comprising chipped whole wood logs as a substrate for growth of plants. It further provides a method of making a substrate comprising wood chips for growth of plants, and a method of growing potted plants in a composition comprising chipped wood logs as the primary substrate for growth.

21 Claims, 9 Drawing Sheets

CHIPPED WOOD AS A SUBSTRATE FOR PLANT GROWTH

CROSS-REFERENCE TO RELATED APPLICATIONS

This application relies on and claims the benefit of the filing date of U.S. Provisional Patent Application No. 60/628,776, filed 18 Nov. 2004, the entire disclosure of which is incorporated herein by reference.

BACKGROUND OF THE INVENTION

1. Field of the Invention

The present invention relates to substrates for growth of plants, and methods of preparing and using such substrates. In particular, the present invention relates to substrates and methods for growing plants in contained environments, such as in containers in greenhouses, nurseries, private homes, or businesses.

2. Description of Related Art

The greenhouse and nursery industry in industrialized nations has seen strong growth in the last 40 years. In particular, container-grown plants have become an important part of the industry and an important aspect of home and office aesthetics. Growth of plants in containers, at least until they are introduced into a suitable final in-ground location, has become the standard method for supplying and maintaining many plants, including flowering plants, shrubs, trees, and the like, both in greenhouses and nurseries and in homes and offices. In view of the importance and scale of growing plants in containers, much time and research has been expended to develop and optimize growth conditions for growth of plants in containers. Most of the time and research has been focused on identifying suitable substrates, watering regimens, and amendments for growth of various plants.

Peat moss and softwood bark have provided the primary base for most greenhouse and nursery substrates over the last 30 years. These materials are excellent substrates but their future availability and cost is uncertain. For example, the environmental concerns of mining peat moss, which is a non-renewable natural resource found predominantly in the British Isles, Northern Europe, Scandinavia, and Canada, and the increasing costs of mining and shipping this substrate are factors that are predicted to significantly limit its availability and use in the future. In addition, although softwood bark is a renewable resource that appears to be satisfactorily available and properly managed at this time, the availability of softwood bark of consistent quality is often a problem due to the variety of methods used to harvest, process, and store bark. Furthermore, potential movement of the lumber and paper industry from the U.S. to other countries will likely limit the supply of softwood bark in the U.S., raising the question of future availability and further escalating the price of this substrate.

In recognition of the potential loss of peat moss and softwood bark as substrates for container plants, and in recognition of the escalating costs of these substrates over the years, many studies have investigated the use of various industrial and agriculture waste, such as animal waste (Tyler, et al., 1993b), cotton gin waste (Owings, 1993), wood by-products (Lunt and Clark, 1959, Chong and Lumis, 2000), municipal leaf and sewage sludge (Bugbee, et al., 1991, Rosen, et al., 1993), rice hulls (Dueitt et al., 1993), and residential refuse (Kahtz and Gawel, 2004) as substitutes for bark and peat moss. Most of these alternative substrate components show promise in that they are non-toxic to plants and can be successfully used to amend conventional substrates (i.e., peat moss, bark, soil, clay, and sand). However, a limited supply of a uniform and consistent quality product of each of these reduces their widespread use. Furthermore, none of these amendments have proved to be suitable as the sole substrate for growth of container plants.

Thus, there is a continuing need in the art for improved substrates for container plants. In particular, there is a need in the art for a relatively inexpensive, abundant, renewable substrate that can be used as the sole substrate, or as the main constituent of a substrate, for growth and maintenance of container plants.

SUMMARY OF THE INVENTION

The present invention addresses needs in the art by providing a substrate for growth of container plants. As used herein, substrate means a composition that contains all of the components of the root rhizosphere in a container. Thus, it is any material or combination of materials used to provide support, water retention, aeration, and/or nutrient retention for plant growth. Other terms that are used herein interchangeably with "substrate" are "medium" and "mix". The substrate comprises wood chips of a defined size range and size distribution, which are intentionally adjusted based on pre-defined criteria to achieve a substrate that is suitable for growth of one or more plants, such as plants of interest to the greenhouse and nursery industries. The substrate can comprise wood chips as the sole component of the substrate, the component making up the majority of the volume of the substrate, the sole wood-containing component of the substrate, the majority of the volume of wood-containing components, or any other amount of the substrate. Because it is a primary product (rather than a by-product) of the wood products industry, the substrate of the invention can be provided as a product with consistent quality from batch to batch, season to season, and year to year. It is derived from a renewable resource that can be managed to maintain not only quantity, but quality as well. Indeed, in view of the land area available for growth and maintenance of forests in the U.S. and throughout the world, the substrate of the invention can be considered to be available, at least for the foreseeable future, in unlimited supplies. Furthermore, because the substrate is derived from an abundant, renewable natural resource found in the U.S. and across the globe, it can be provided at an economically attractive price.

The present invention also provides methods of making the substrate of the invention. In general, the methods of making the substrate comprise providing the wood (i.e., portion containing secondary xylem) of a woody plant, such as a tree, or the wood-like material (i.e., portion containing primary xylem) of a wood-like plant, such as bamboo and the like, and chipping the wood or wood-like material to a suitable size range. Unless otherwise noted, as used below, "wood" is intended to encompass both wood and wood-like material. As used herein, "chipping" means any mechanical action that results in breaking, tearing, shaving, splitting, or cutting wood to achieve smaller wood pieces, preferably of a controlled size range. Thus, chipping can be accomplished by chipping, impact action, grinding, crushing, splitting, sawing, shaving, extrusion, steam explosion, and the like. The methods can include other steps, such as isolating, at least partially, the wood from other parts of the plant from which it originated (e.g., peeling away bark, stripping away leaves) before chipping. Accordingly, in embodiments, the methods provide for use of a woody plant or wood-like plant, and in particular the wood of a woody plant, in the production of a substrate for growth of container plants.

The invention also provides methods of using the substrate of the invention to grow plants. In general, the methods of growing plants comprise providing the substrate and contacting the substrate with a plant. In embodiments, the substrate is provided in a container. The substrate can be provided in the container before the plant or after the plant is contained in the container. In other embodiments, the substrate is provided in a planting bed or area in the earth. In embodiments, the plant is a plant seed, which is placed on top of the substrate or embedded within the substrate. The methods of using the substrate to grow plants can also include maintaining the plant in contact with the substrate for a sufficient amount of time for the plant to grow. The methods may further include adding additional substances to the substrate, plant, or both before, during, or after contacting the plant and substrate. Accordingly, in embodiments, the invention provides for use of the substrate to grow plants, as the sole component, the majority of the volume of components, or as a minority of the volume of components (such as an amendment to soil for landscaping, production beds, and the like).

DETAILED DESCRIPTION OF EXEMPLARY EMBODIMENTS OF THE INVENTION

Figure 1:
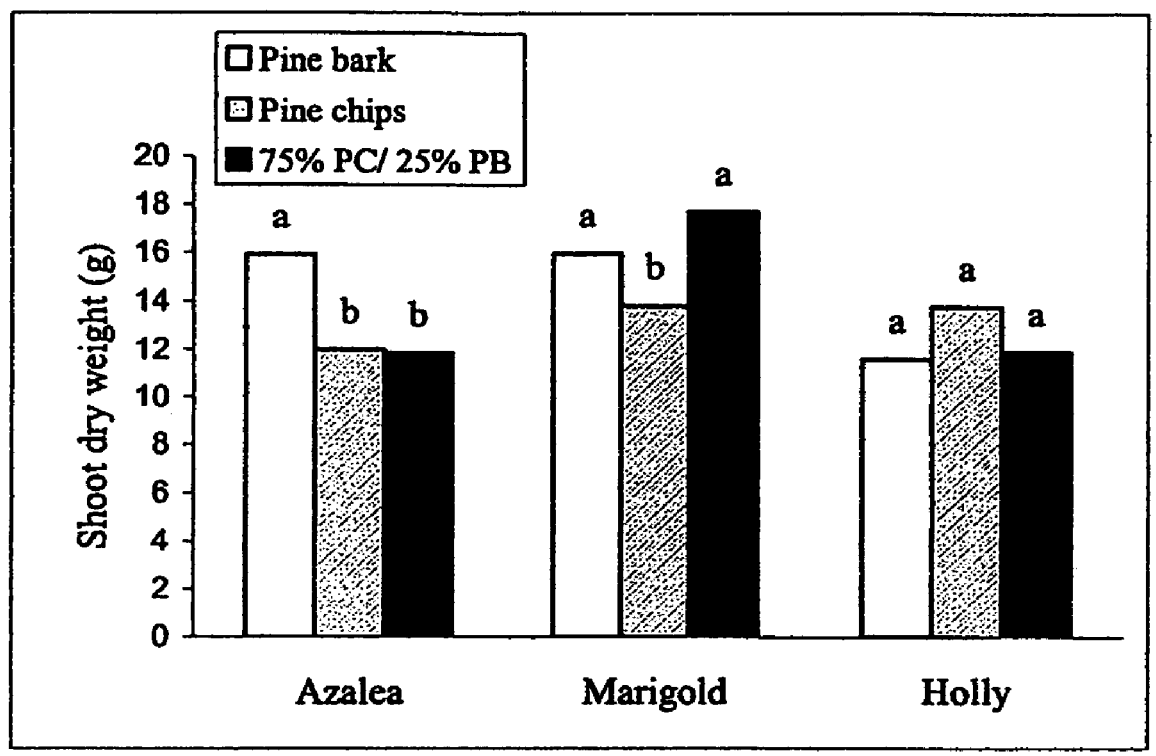
FIG. 1 depicts shoot dry weight of plants grown in three different substrates. Treatments with the same letter above bars within the same species are not significantly different (P<0.05); Duncan's multiple range test.

Reference will now be made in detail to exemplary embodiments of the invention. The following detailed description is provided to explain in detail certain exemplary aspects and embodiments of the invention, and should not be considered as limiting the scope of the invention to the particular exemplary embodiments described.

As discussed above, it is known that two byproducts of the forestry industry, pine bark (Porkorny and Wetzstein, 1984) and sawdust (Ehret, et al. 1998), are acceptable components of container substrates. In developing the present invention, the inventor proposed that whole tree logs processed into a container substrate may be a suitable and economical alternative to currently available substrates. Trees are renewable, reasonably priced, and widespread geographically. However, the wood has not been used as a substrate for growth of plants to date for various reasons, including the belief that certain untreated wood would be toxic to plants and would not provide the necessary contact surface for roots, the necessary aeration, and/or the necessary nutrient delivery necessary for survival and growth of plants. The present inventor has surprisingly discovered that chipped wood, such as that from whole tree logs, can act as a suitable substrate for growth and maintenance of container plants, such as greenhouse and nursery crops, which include, but are not limited to, container plants for sale and placement in homes and offices. Unlike sawdust, the wood chips of the present invention can be prepared to have a mixture of coarse and fine particles, which provides excellent aeration, a high surface area for contact with roots, excellent delivery of nutrients to roots, and high water retention.

Thus, in a first aspect, the present invention provides a substrate for growth of plants, including, but not limited to, container plants and plants for landscaping and those grown in production beds. The substrate is a composition that comprises wood chips of different sizes, dispersed about a broad, pre-defined size range. As used herein, wood chips means a collection of fragments of the woody (i.e., xylem-containing) part of a plant, ranging in size from about 10 cm or larger long to about 1 micrometer ($\mu m$) or smaller long, about 10 cm or larger wide to about 1 $\mu m$ or smaller wide, and about 10 cm or larger thick to about 1 $\mu m$ or smaller thick. As used herein, the term "about" indicates a number within 10% of that given, preferably within 5% of that given, more preferably within 1% of that given. In embodiments, the wood chips are dispersed among numerous general shapes and sizes.

As a practical matter, it is easiest to describe the size of the chips with reference to the pore size of a sieve through which the particles can pass, rather than on each particle's particular shape and the approximate size of each dimension. In general, the wood chips have a range from about 100 mm or more to about 0.001 mm or less. In embodiments, the wood chips that comprise the substrate of the invention have the following sieving characteristics: a range of from about 100 mm to about 0.01 mm or less, with greater than 95% of the chips having a size of about 100 mm to about 1 mm; a range of from about 50 mm to about 0.01 mm or less, with greater than 95% of the chips having a size of from about 50 mm to about 1 mm; a range of from about 20 mm to about 0.01 mm or less, with greater than 95% of the chips having a size of from about 20 mm to about 0.1 mm; a range of from about 20 mm to about 0.01 mm or less, with greater than 95% of the chips having a size of less than about 2 mm; a range of from about 20 mm to about 0.01 mm or less, with greater than 95% of the chips having a size of less than about 1.5 mm; a range of from about 20 mm to about 0.01 mm or less, with greater than 95% of the chips having a size of less than about 0.75 mm; a range of from about 20 mm to about 0.01 mm or less, with greater than 95% of the chips having a size of less than about 0.5 mm. In embodiments, the chips have a range from about 10 mm to about 0.01 mm, with greater than 95% of the chips having a size below 5 mm; a range from about 10 mm to about 0.01 mm, with greater than 95% of the chips having a size below 2 mm. In embodiments where relatively large (i.e., greater than 10 mm) chips are present, such chips preferably comprise at least about 0.5%, such as about 1%, about 5%, about 10%, about 20%, about 25%, and about 50% or more, of the total.

In certain embodiments, about 30% to about 50% of the wood chips are about 0.5 mm or smaller. In embodiments, over 50% of the wood chips are about 0.5 mm or smaller. In embodiments, about 35% or more of the wood chips are about 0.5 mm or smaller. In embodiments, about 20% or more of the wood chips are about 0.5 mm or smaller. In embodiments, about 5% or more of the wood chips are about 0.125 mm or smaller. In embodiments, at least about 1% of the wood chips are 0.1 mm or smaller, such as about 0.063 mm or smaller or 0.01 or smaller. Size ranges and distributions of various exemplary embodiments are disclosed in Table 1. Size ranges and distributions of various exemplary embodiments, along with a typical size range and distribution of sawdust from the timber industry, are disclosed in Table 2.

TABLE 1

Size and approximate percent distribution of exemplary substrates

| Size (mm) | % | % | % | % | % | % | % | % |
|---|---|---|---|---|---|---|---|---|
| ≧2 | 40 | 25 | 5 | 5 | 1 | 1 | 22 | 0 |
| 1.99–0.5 | 25 | 40 | 25 | 5 | 60 | 66 | 68 | 20 |
| 0.49–0.25 | 25 | 25 | 40 | 25 | 25 | 20 | 6 | 50 |
| 0.24–0.125 | 5 | 5 | 25 | 40 | 10 | 10 | 2 | 20 |
| <0.125 | 5 | 5 | 5 | 25 | 4 | 3 | 2 | 10 |

The size ranges and distributions of other specific embodiments are disclosed in Table 2, below.

TABLE 2

Particle analysis of six different container substrates

| Mesh Size (mm) | Embodiment of Invention (Example 1) | Embodiment of Invention (Example 3) | Embodiment of Invention | Embodiment of Invention | Sawdust |
|---|---|---|---|---|---|
| | | | Percent | | |
| >12.5 | 0 | 0 | 0 | 0 | .3 |
| 6.3 | .4 | 0 | 0 | 0 | 1.6 |
| 4.75 | 1.2 | 0 | 0 | 0 | 2.7 |
| 2.36 | 56 | .7 | .2 | 16 | 22.6 |
| 2 | 1.3 | .7 | .2 | 6 | 6.4 |
| 1.4 | 9.4 | 5.2 | 3 | 25 | 21.8 |
| .71 | 21.4 | 35 | 53 | 36 | 27.6 |
| .5 | 3.5 | 22 | 12 | 7 | 7.3 |
| .355 | 2.2 | 15 | 10 | 4 | 4.6 |
| .25 | 1.5 | 8.7 | 9 | 2 | 3.0 |
| .177 | 1.0 | 6.1 | 6 | 1 | 1.1 |
| .125 | .5 | 3.5 | 3 | 1 | .4 |
| .09 | .4 | 2.3 | 2 | 0 | .2 |
| .063 | .2 | .9 | .8 | 0 | .1 |
| 0 | .1 | .9 | .4 | 0 | 0 |

As can be seen from Table 2, the particle distribution of substrates of the present invention contrasts to the typical sieving characteristics of sawdust produced at a commercial mill, which generally shows a particle dispersion in which greater than 95% of the particles have sizes between 4.75 mm and 0.25 mm, and in which no particles have a size below 0.063 mm.

Because the wood chips of the present invention comprise chips having sizes that are widely distributed along a broad range of sizes, including sizes above and below the sizes of particles of sawdust, sawdust is not a wood chip according to the present invention. In other words, the substrate according to the present invention, while possibly containing wood particles having sizes that overlap with the sizes of sawdust, does not include sawdust as the sole component. Indeed, although sawdust shows a range of particle sizes, its lack of large particles (which are envisioned as useful in many embodiments, particularly those relating to in-ground soil amending) and small particles (which are envisioned as useful in many embodiments, particularly those relating to container growth of plants) eliminates it as a wood chip according to the invention. For example, because sawdust does not contain many, if any, particles having a size of below about 0.05 mm, it does not provide one or more advantages of the present wood chips, such as, for example, good wood chip to root surface area contact. Furthermore, in contrast to sawdust and bark chips known in the art, which are by-products of the timber and lumber industry, the wood chips of the present invention are a primary product that are manufactured to meet particular, pre-defined size ranges and size distributions within the size ranges.

The wood chips of the present invention are provided in the substrate of the invention as a mixture of different size particles. Having a broad range of particles of different shapes provides benefits over other wood products that have been used in the art, such as sawdust. For example, because there are numerous sizes and shapes of wood particles within the substrate of the invention, it is possible to pack the wood chips more closely together than would be possible when using sawdust, which has a relatively uniform size and shape. Owing to this characteristic, the present substrates are considered to provide improved surface area for contact with the roots of plants being grown in them. Furthermore, because the present substrates comprise wood chips having relatively small sizes (e.g., 0.5 mm or less), the present substrates have better water retention and nutrient retention properties than substrates comprising sawdust as a primary component. Likewise, the improved water and nutrient retention permits improved release of these substances to the roots when needed, improving growth and maintenance of plants as compared to those grown in substrates comprising sawdust as the major wood component (such as pine bark and peat moss), and reducing the costs associated with feeding and watering of the plants, and the associated runoff of leached nutrients into the environment.

The wood chips comprising the substrates of the present invention are prepared to achieve a pre-defined size range and distribution, and thus can be designed to improved certain characteristics (e.g., aeration, nutrient retention) based on the individual needs of each grower or each plant species. Thus, unlike sawdust, which is a byproduct of the timber industry, the substrates of the present invention, as primary products, can be designed individually for each plant or grower. The substrates of the present invention have proved in embodiments to provide superior root to shoot ratios as compared to substrates comprising pine bark and/or peat moss. Furthermore, in contrast to sawdust, which is in limited supply based on the fact that it is a byproduct of the timber industry, the wood chips of the present invention are available in an essentially unlimited supply, which can be controlled with regard not only to size and size distribution, but with regard to content (e.g., species of wood present, amount of bark present).

The wood chips can be derived from any woody or wood-like plant. In preferred embodiments, the plant is a tree, such as a softwood or hardwood tree. Non-limiting examples of trees that can be the source for the wood chips are: *Acer, Quercus, Thuja, Tsuga, Pseudotsuga, Liriodendron, Platanus, Populua, Pinus, Abies, Betula, Carya, Catalpa, Cedrus, Chamaecyparis, Fraxinus, Gleditsia, Picea, Larix*, and *Tilia*. Thus, in embodiments, the wood chips are made from pine trees, such as loblolly pine, southern pine, yellow pine, and white pine; fir trees, such as white fir, Douglass fir, spruce, cedar, black fir, Colorado fir, Norway fir, and white fir; oak trees, such as white oak, red oak, live oak, and pin oak; poplar trees, such as tulip poplar, hybrid poplar, and aspen; and maple trees, such as sugar maple, red maple, and silver maple. Wood-like plants include, but are not limited to, bamboo, Melaleuca, and the like. Wood chips according to the invention may be derived from any or all xylem-containing parts of a plant, including trunk, branches, shoots, and roots. It is preferred that the wood chips are derived from the trunk or branches of a tree, with the trunk being the most preferred.

As mentioned above, the substrate according to the invention comprises wood chips. The present invention recognizes that other parts of a woody plant (e.g., bark, leaves) may be present in the wood chips and substrates of the invention. However, it is to be noted that these other parts are considered unintentional or insignificant contaminants of the composition, or intentional amendments to the compositions that are added in relatively small amounts to achieve a desired result. According to the invention, these other parts of the woody plant do not exceed the amount, volume, or weight of the wood chips. In embodiments, they are maintained at an amount less than about 40% (by volume) of the substrate, preferably less than about 30%, less than about 20%, less than about 10%, less than about 5%, less than about 2%, less than about 1%, or less than about 0.5% of the substrate. As a practical matter, it is preferred that the bark, leaves, and other non-wood portions of the woody plant be removed prior to preparation of the wood chips of the invention to maximize the profitability of harvesting of the plant, to minimize wear and tear on the machine used to make the wood chips, to reduce the cost of producing the substrate of the invention, and to reduce the amount of composting or decay of the substrate. From an economic standpoint, it is preferable to remove the bark for other purposes prior to making the wood chips of the invention. Furthermore, the bark and leaves of the tree contain soil, sand, rocks, resins, etc. that can impair the function of machines used to make the wood chips of the invention. In addition, because bark, leaves, and small limbs and twigs are known to degrade and compost, their presence in the substrate, while often difficult or impossible to completely avoid, is often undesirable because they cause shrinkage of the substrate and can accelerate decomposition of the otherwise highly stable wood chips. Of course, in embodiments, such a result might be desired; however, it is envisioned that most users will want a highly stable product with little or no initial decomposition potential. Thus, from the standpoint of the total cost to make and maintain the wood chips of the invention (which includes purchasing and maintaining the chippers), it is preferable to remove the bark and leaves before the chipping process begins.

As discussed above, the substrate of the invention comprises wood chips. The substrate can comprise wood chips as the sole component, or it can comprise other components in addition to the wood chips. Thus, in embodiments where the substrate comprises wood chips as the sole component, the terms "wood chips" and "substrate" are synonymous. Where other components are present in the substrate, the wood chips comprise a majority of the volume of the substrate. That is, when other substances are included in the substrate, the total volume of the substrate is maintained such that wood chips comprise more than 50% of the volume of the substrate, such as more than about 60%, more than about 70%, more than about 80%, more than about 90%, more than about 95%, more than about 98%, more than about 99%, or more than about 99.5%. The sole exception to this characterization is when water or a water solution is the other, or one of the other, components included in the substrate. Because water has unique properties with regard to flow, evaporation, and retention on or within the wood chips, and because it is generally required to be added in relatively large volumes at relatively frequent intervals, although it is considered herein as a substance for the purposes of conveying nutrients, salts, and the like, for the purpose of calculating the percent volume of wood chips and other components, water and substances dissolved in it are not considered.

As discussed above, the present invention provides wood chips that are suitable for use in plant growth. Although in many embodiments, the wood chips comprise the main, major, predominant, etc. component of the substrate, in certain embodiments, the wood chips of the invention are used as an amendment to a substrate. Thus, in embodiments, the wood chips comprise half or less of the volume of the substrate, and may comprise a minority of the volume of wood products in the substrate. Typically, these embodiments relate to nursery or production bed growth of plants, where the plants are grown in-ground or in containers. It is envisioned that the wood chips of the present invention are a suitable and economic amendment to peat moss and substrates comprising peat and other components typically used in container and in-ground growth of plants. Thus, the wood chips of the invention can be used as a substitute for perlite, vermiculate, and/or pine bark (among other things), which are typically added to peat moss to improve water drainage and aeration. In embodiments where the wood chips are used as an amendment to a substrate, they can be added to achieve any final amount, including as little as 0.5% to as much as 50%. For the purposes of this disclosure, when the wood chips are present in an amount of more than 50%, by volume, they are considered to be the main component of the substrate, and not an amendment. Typically, the wood chips are added as an amendment to open up the soil (e.g., to provide aeration to the roots), but a further advantage is that they provide suitable properties for growth of plants at a reduced cost, as compared to other amendments that provide similar properties.

Wood chips according to the present invention are not composted, or essentially not composted. By essentially not composted, it is meant that, although some composting or degradation of the wood may have taken place (intentionally or simply by virtue of the chips being maintained at the site of production or storage for a certain amount of time before shipping), at least about 90%, preferably at least about 95%, more preferably at least about 99% of the wood of the chips is in the same degradative state as when produced from the chipper (used broadly here to indicate any machine that creates the wood chips of the invention). Thus, wood chips according to the invention are preferably provided in an undegraded, or essentially undegraded state.

The wood chips may be provided in the state that they were obtained or in an essentially undegraded state, or they may be further processed in accordance with the methods of making the substrate of the invention, discussed in detail below. Further processing may include separating out different size wood chips from other size wood chips, adding certain sizes of wood chips to other size wood chips to achieve a desired range and proportion of wood chips in a particular composition, or further chipping of the wood chips to reduce the size of the wood chips or change the size distribution of the wood chips within a mixture of wood chips.

Further processing can also include adding substances that are adsorbed onto the surface of the wood chips or absorbed into the wood chips (i.e., incorporated into the wood). Adsorbing and absorbing can be accomplished by exposing the wood chips to the substance in an appropriate form (e.g., solid, liquid, gas) for a sufficient amount of time to achieve the desired level of adsorption or absorption. Non-limiting examples of substances that can be adsorbed onto or absorbed into the wood chips include surface active agents or wetting agents, nutrients, fertilizers, colorants (such as dyes), and water. In embodiments, two or more substances are adsorbed onto or absorbed into the wood chips. The amount of each substance to be exposed to the wood chips and the amount of time can be selected by those of skill in the art without undue or excessive experimentation.

In certain embodiments, the wood chips are colored with a colorant, such as a dye. Substrates having any number of colors can be produced in accordance with this invention, and such colored substrates can have aesthetic appeal to end-user purchasers. One example of an everyday use of such colored substrates relates to home decorating. In this example, different lots of substrate having different colors can be produced, optionally mixed, and bagged for sale at a home center or home improvement store. A homeowner can then select an appropriate color or color mix such that it will match, complement, etc. the color of the plant to be potted, the table or floor upon which the plant will sit, the color of the container, the color of the walls, or any other characteristic of interest to the end-user purchaser.

In addition to wood chips, the substrate of the present invention may comprise other substances. Such substances can be any of those typically added to container substrates to aid in the growth and maintenance of a plant in a container. Such substances may also be any substance that imparts a desired characteristic to the substrate (such as a colorant, as discussed above, an anti-fungal agent, etc.). The only limitation on the substance that may be included in the substrate is that is must be biologically compatible with the plant to be grown in the substrate, either in the form as added to the substrate or in the form in which it will exist when the substrate is used to grow and/or maintain a plant. Thus, the substrate may be a substance that is toxic to a plant, but that is removed or converted to a non-toxic substance prior to contacting the plant with the substrate. Examples include toxic gases that can be used to sterilize the substrate, solvents that can be used to deliver absorbed or adsorbed substances, and compounds that are degraded by exposure to light, such as UV light. In addition, the substance may be one that is toxic to one or more living organisms other than plants. Thus, it can be a biocontrol agent that is included to inhibit the growth of one or more molds or fungi, or another organism that is detrimental to plant growth or health, that degrades the wood chips, or that creates a toxic product from wood or one or more of the amendments present in the substrate. Numerous biocontrol agents are known in the art, and it is envisioned that any of them can be included in or on the wood chips, or in the substrate in general.

Traditionally, plants have been and still are grown in containers containing soil as the substrate for the plants. The soil provides all of the functions that soil in the environment provides, including supporting the plant, providing nutrients for the plant, providing moisture for the plant, and providing air for the roots of the plant. However, additional considerations are required when growing plants in containers. For example, soils often must be sterilized to reduce the chance of fungal infections of the potted plant. Likewise, coarse substances often must be added to reduce the tendency of the soil to compact.

Soil-less substrates for container growth of plants also must provide the same functions that environmental soil provides. That is, the soil-less substrate must support the plant, provide sufficient nutrients for the plant to grow and live, provide moisture for the plant, and provide air for the roots of the plant. Current soil-less substrates used in the art that comprise a high amount of wood are based on bark (predominantly fir bark or pine bark) or sawdust (predominantly fir, hemlock, or redwood sawdust). To achieve the necessary functions and provide a suitable substrate for growth of plants, soil-less substrates are typically amended with various substances, either at the time of production, time of planting, or at various times during growth of the plant.

Common amendments that are added to soil and soil-less substrates for growth of plants in containers, include, but are not limited to peat moss (spaghnum; provides carbon, nitrogen, and nutrients, increases water holing capacity), bark (provides aeration, water, and nutrients), sand (reduces drainage in container substrates), clay (enhances cation exchange capacity and water holding); pumice (improves water retention, drainage, aeration), perlite (improves water retention and aeration), vermiculite (improves water retention and improves cation exchange capacity), lime (raises pH and supplies calcium and magnesium), gypsum (supplies calcium and sulfur), humus and other composts (adds nutrients and microbes), and general purpose or custom fertilizers (adds macro- and micro-nutrients). Exemplary amendments also include, but are not limited to, coir (shredded coconut husks), composted yard waste, composted animal and human waste, newspaper, and nitrified sawdust (typically redwood sawdust, partially degraded). Additional exemplary amendments include, but are not limited to, surfactants, polymer gels for increased water retention, and plastic or styrofoam balls.

The substrate of the present invention may include one or more substances, such as an amendment, in addition to the wood chips. When included, these substances comprise a relatively small portion of the total volume of the substrate, typically less than about 30% of the total volume, more typically less than about 25%, 20%, 15%, 10%, or 5%, such as 3%, 2%, 1% or 0.5% of the total volume of the substrate. When included, the substances may be added to the substrate at any time, such as at or about the time of chipping, between the time of chipping and creation of the substrate, at or about the time of creating the substrate from the raw wood chips, at or about the time of planting of the plant, and/or at one or more times during the growth and/or maintenance of the plant in the container. As discussed above, in addition to comprising the main component of a substrate, in embodiments the wood chips of the invention may be used as an amendment for other substrates. In such embodiments, the wood chips comprise 50% or less of the volume of the substrate, such as precisely or about 45%, 40%, 35%, 30%, 25%, 20%, 15%, 10%, 5%, 2%, or 1%.

Although not included in the calculation in determining the amount of substances present in the substrate, the present invention contemplates water as part of the substrate. Water can be adsorbed onto or absorbed into the fibers of the wood chips or in one or more other substance that may be included in the substrate, such as vermiculite, pumice, perlite, and the like. Thus, water may be present in the substrate bound to the wood chips. In such a situation, the volume contributed by the water, if any, is considered to be part of the volume of the wood chips. The water may be pure water or a water solution that contains dissolved or dispersed substances, such as, but not limited to, fertilizers, lime, and salts or other nutrients.

The substrate can be provided in units of any form, including, but not limited to, piles (such as those at a wood processing site, greenhouse, or nursery containing hundreds of pounds or kilograms, or one or more tons or tonnes), bags (such as a bag containing 5 pounds (2.3 kg), 10 pounds (4.5 kg), 20 pounds (9 kg), 30 pounds (13.6 kg), 40 pounds (18 kg), or the like; containing 2 cubic feet, 4 cubic feet, 6 cubic feet, and the like), boxes, or planting container (also referred to herein as a planting pot or simply a container). When provided in relatively large volumes, such as amounts typically found at wood processing sites, greenhouses, nurseries, and packaging sites, the substrate can be provided in any convenient density. It is envisioned that the density will typically be that resulting from the chipping process, natural settling, and the process used for delivery to the greenhouse or nursery (e.g., dumping by dump truck, front-end loader, or the like). However, compacting or loosening may be used to adjust the density to the desired level. When provided within a container, the substrate may be packed to any density. However, in preferred embodiments, the substrate is provided in a planting container in a density that is suitable for growth of a plant. Exemplary parameters for the substrate in a planting container are: bulk density of about 0.10–0.20 g/cc; total porosity of the substrate of about 75–90%; air space of about 10–25%; container capacity of about 50–65%; available water content of about 25–35%; and unavailable water content of about 20–30%. Other exemplary parameters for the substrate in a planting container are: bulk density of about 0.10–0.75 g/cc; total porosity of the substrate of about 40–90%; air space of about 4–50%; container capacity of about 40–70%; available water content of about 20–40%; and unavailable water content of about 20–40%. The particular parameters for any individual embodiment can be selected from among the parameters given herein (or within the ranges of the parameters) or based on parameters known by those of skill in the art to be suitable for growth of plants in containers or in-ground. The parameters for one particular embodiment of the invention are disclosed in Table 6, below.

It is evident from the above disclosure that, in embodiments, the present invention provides wood chips having a range of sizes from about 0.05 mm or less to about 10 mm or more, wherein at least 0.5% of the wood chips have a size of 0.05 mm or less. Thus, it provides wood chips as part of a composition. It also provides a substrate for growing plants that comprises wood chips of the invention, such as those having a range of sizes from about 0.05 mm or less to about 10 mm or more, wherein at least 0.5% of the wood chips have a size of 0.05 mm or less. Examples include, but are not limited to, those in which the wood chips comprise a majority of the volume of the substrate, the substrate comprises wood chips from a single species of plant and the substrate comprises wood chips from two or more species of plants. Examples also include substrates that comprise one or more substances in addition to wood chips. Examples of such substances include, but are not limited to, nitrogen, carbon, phosphorous, potassium, sulfur, calcium, magnesium, copper, iron, manganese, zinc, boron, molybdenum, aluminum, nickel, water, and combinations of two or more of these substances. Examples also include colorants.

In a second aspect, the present invention provides methods of making the substrate of the invention. In general, the methods of making the substrate comprise providing wood (i.e., the xylem-containing part) of a woody plant or wood-like plant, and chipping the wood to a suitable size range.

According to the method of making the substrate of the invention, providing means making wood available for chipping in a form and position that is suitable for chipping. Thus, providing can be any of a number of activities, including, but not limited to, feeding wood into a machine that performs the chipping step, or contacting a machine that performs the chipping step with a stationary piece of wood. Providing can also include one or more steps prior to contacting the wood and chipping machine. For example, in embodiments, providing comprises removing all or essentially all of the bark from the wood. In embodiments, providing comprises removing all or essentially all of the leaves from the wood. When the method is practiced on trees, providing can comprise removing all or essentially all of the portions of the tree with the exception of the trunk. Providing can include providing a single species of woody plant or wood-like plant for chipping, or providing two or more species. In situations where a substrate comprising wood chips from two or more species of plant is desired, providing can include identifying and combining wood from the desired species in the amount of each desired to achieve a mixed product having a pre-defined composition. Providing can also include more mundane activities, such as, but not limited to, keeping track of the number, volume, weight, species, etc. of pieces of wood being provided for chipping. Tracking of the species and amounts being provided for chipping allows precise control of the make-up of the wood chips, and thus substrate, produced by the method. It also allows for precise tracking of costs and machine load.

Chipping is the process of converting relatively large pieces of wood, such as logs, into wood chips having the characteristics described above. As used herein, logs comprise the entire woody part (xylem-containing part) of a plant, or any fraction of that woody part. Thus, a log may be the trunk of a tree, one or more branches of a tree, or short sections (e.g., sections of 5 feet (1.5 meter), 10 feet (3 meters), 15 feet (4.5 meters), 20 feet (6.1 meters), 25 feet (7.6 meters), 30 feet (9.1 meters), etc. of the trunk or a branch). As discussed above, although it is preferable to exclude, to the extent possible, bark, leaves, and other non-woody parts of the plant, as used herein, logs may contain non-woody parts of the plant. As discussed above, "chipping" means any mechanical action that results in breaking, tearing, shaving, splitting, or cutting wood to achieve smaller wood pieces, preferably of a controlled size range. Thus, chipping can be accomplished by chipping, grinding, crushing, splitting, sawing, shaving, and the like. Numerous machines that can achieve these processes are known and used in the art, and those of skill in the art may select the most appropriate one without undue experimentation. In preferred embodiments, a chipper typically used to chip whole logs for use in power plant production or the paper industry is used to perform the chipping step. Exemplary machines include, but are not limited to a Morbark Chipper (Morbark Inc., Winn, Mich.) and a Jones Mighty Grinder (Jones Manufacturing Co., Mount Beemer, Nebr.).

In embodiments, chipping includes continuing the process beyond the initial chipping until a size range for the chips is achieved. Typically, a hammer mill or other equivalent machine is used to achieve a suitable size range. Exemplary machines that are suitable for this process include, but are not limited to, mills from such manufacturers as Prater Industries, Inc. (Cicero, Ill.), Bliss Industries, Inc. (Ponca City, Okla.), Meadows Mills, Inc. (North Wilkesboro, N.C.), and the Crary Co. (West Fargo, N. Dak.). It can also include continuing the process until a certain distribution of chip sizes within a suitable size range is achieved. Thus, it can include taking wood chips produced by a single pass through a chipping machine (used here broadly to include all machines capable of making wood chips according to the invention) and running them through the machine again. It can also include taking the chips and running them through a different machine that is capable of making wood chips according to the invention, such as those mentioned above, or screening the chips through an additional machine to achieve the desired particle size and quality. An exemplary type of screener that can be used is the Erin Systems, Inc. (Portland, Me.) Starscreener.

The method of making a substrate according to the invention can comprise other steps as well. In embodiments, the method of making a substrate further comprises processing the wood chips after chipping. Processing can take any number of forms. For example, processing can include adjusting the size range of wood chips produced during the chipping step. In these scenarios, the adjusting can be considered an optional step within the chipping step or an optional further processing step. The difference is simply a matter of characterization—the process performed is the same. Processing can also comprise adjusting the size distribution of wood chips within a size range. For example, for certain applications it has been found that substrates having a high percentage of wood chips in the range of 0.5 mm to 0.1 mm is desirable for greenhouse plants grown in small containers for 4 months or less. However, for outdoor container crops in larger containers grown for 1–2 years, it is envisioned that a relatively high percentage of particles in the 2 mm to 0.5 mm range will be beneficial. In general, substrates for indoor plant growth, for plant growth in small containers, or for short periods of time will contain a relatively high percentage of small particles (i.e., smaller than about 0.1 mm). Conversely, substrates for outdoor plant growth, growth in large containers, or growth for extended periods of time in large containers or outdoors will contain, in general, a relatively high percentage of large particles (i.e., larger than about 1 mm). Due to their size, large particles will remain intact for relatively long times before degrading, thus providing aeration and other beneficial properties to the rhizosphere. In embodiments, a high percentage of both large particles and small particles are included in a substrate to provide rapid initial growth of the plant (which can benefit from the small particles) and long-term continued growth of the plant (which can benefit from the large particles).

The present invention provides one the ability to design numerous substrates based on various different considerations. For example, a substrate for outdoor growth of crops can be made by chipping and further processing to achieve a high percentage of relatively large particles. Likewise, specific substrates can be made to achieve growth of various different species of plants and plants at different stages in their life cycles. It is known that different species of plants have different optimal growth conditions, and that plants have different growth requirements at different stages in their life cycles. The present invention addresses these problems by providing pre-defined mixes for growth of individual plant species and pre-defined mixes that either naturally change over time to adjust to the needs of the plant as it grows, or that can be easily amended with more substrate to continually achieve a suitable growth medium as the plants mature.

Thus, the present methods and wood chips and substrates produced by those methods provide superior growth and maintenance characteristics for plants grown on the substrates of the invention. Thus, in embodiments, the size distribution of wood chips within the desired range is adjusted to achieve an advantageous distribution. Typically, adjusting the size range and size distribution within the size range is performed to achieve a particular substrate showing advantages under certain conditions over soil-less substrates known in the art or over one or more other substrates that can be made in accordance with the present invention.

Processing can also comprise combining or mixing (used interchangeably herein) one type of wood chips with another. For example, it can include mixing chips of one size range and/or size distribution with chips of another size range and/or size distribution, in any relative amounts. It can also include mixing chips made from one or more species of plant with chips of one or more other species of plant, in any size ranges or distributions. In summary, processing can comprise mixing any amounts, sizes, types, etc. of wood chips with any amounts, sizes, types, etc. of other wood chips to create a mixture having unique, pre-determined, or otherwise desirable properties.

Processing can also comprise adjusting the density of wood chips in the substrate. As alluded to above, the wood chips coming off a chipper (broadly speaking) will generally collect in a pile have a certain density, which will be based primarily on the type of machine used for chipping, the speed at which chipping was performed, the size of chips made, the type of wood comprising the chips, and the size of the pile of wood chips made. If left undisturbed, the density of this pile will change over time as natural forces (e.g., gravity, wind, rain) act upon it. In situations where the wood chips are to be the sole component of the substrate (i.e., where the wood chips are the substrate), the density of the substrate can be adjusted before packaging, use in growing plants, etc. to achieve a desired density. This adjustment can be accomplished by any suitable means known in the art for manipulating wood chips or other substrates, like peat moss, which can include compressing into bales. Likewise, the density of the wood chips can be adjusted at the time of preparing the substrate for use in growing a plant (discussed below).

Processing can comprise adding other substances to the wood chips to form a substrate according to the invention. Any substance that is known to be useful for growing plants in containers, and particularly for growing container plants in soil-less substrates, can be added to the wood chips at this stage. Non-limiting examples of suitable substances are given above, and those of skill in the art may select one or more substance to add to the wood chips. In some embodiments, water is added to the wood chips. In some embodiments, one or more fertilizers, one or more nutrients, and/or one or more salts is added to the wood chips. As discussed above, one or more colorants can be added to the wood chips in a sufficient amount to change the natural color to a different color. One exemplary substance that may be added to the wood chips is calcined clay. This can be added for any number of reasons, including, but not limited to, increasing cation exchange between the roots of a plant and the substrate, to increase the water-holding capacity of the substrate, or to adsorb any toxic substances that might be present.

Processing can also comprise transporting the wood chips, in bulk or in smaller quantities, such as bags or the like for sale to end-user consumers, to a site other than the site where the wood chips were created. Transporting can be by any known means, including, but not limited to, trucking, transporting by train, transporting by boat, moving by means of a conveyor belt, shoveling (either manually or using heavy machinery), or any combination of two or more of these. In many embodiments, the wood chips of the invention will be moved in bulk from the site of production directly to the site of use, without any packaging or other manipulations being performed in between other than loading onto a truck, train, etc. to be used to transport the wood chips. In such embodiments, the site of use will typically be a greenhouse, nursery, or other commercial plant growing facility. Mixing of wood chips of differing sizes or species, or any other further processing may be performed before or after transportation to such commercial sites.

Processing can comprise packing the substrate into suitable packaging materials. For example, packing can comprise placing a volume or weight of the substrate in a bag (e.g., a plastic, heat sealable bag, or burlap bag capable of holding 2, 4, or 6 cubic feet), in a box (e.g., a wood box), or in a crate (e.g., a wood crate), and, optionally, sealing the bag, box, or crate. Packing can also comprise placing a volume or weight of the substrate in a container that is suitable for use in growing and/or maintaining a plant. Packing can include any of the various activities performed in the packing industry, without limitation to activities normally associated with packing of agriculture, potting, or landscaping materials.

It is to be understood that processing can comprise two or more of the activities described above, and such activities can be performed in any order desired.

In view of the above description, it is evident that the present invention provides for the use of a plant, and in particular the wood of a woody plant or wood-like plant, in the production of a substrate for growth of plants. The use can be an industrial use or a personal use, and can comprise one or all of the steps discussed above for the making of a substrate according to the invention.

It is evident that the present invention provides a method of making a substrate for growing plants in a container. In general, the method comprises providing wood from a plant, and chipping the wood to produce wood chips having a size range suitable for use as a substrate for plant growth. The method can further comprise processing the wood chips, such as by packaging the wood chips and adding one or more substances to the wood chips. The substances can comprise, among other things, nitrogen, carbon, phosphorous, potassium, sulfur, calcium, magnesium, copper, iron, manganese, zinc, boron, molybdenum, aluminum, nickel, water, or a combination of two or more of these substances. The process can also comprise mixing wood chips made from one species of plant with wood chips made from another species of plant, and/or mixing wood chips having a specific size range and size distribution with other wood chips having a different size range and/or size distribution.

In a third aspect, the invention provides methods of using the substrate of the invention to grow a plant. Stated another way, the present invention provides methods of growing a plant in the substrate of the present invention. In general, the method of growing a plant comprises providing the substrate of the invention, and contacting the substrate with a plant.

Providing means any activity that makes the substrate available for contacting with a plant. Thus, providing can be any of a number of activities, including, but not limited to, making the substrate, obtaining pre-made substrate from a manufacturer or a distributor (e.g., a home center, nursery, or greenhouse), and obtaining wood chips according to the invention and adding one or more substances, adjusting the density, placing the chips into a container, etc. In the case of an end-user who is a homeowner, providing will typically comprise purchasing a pre-defined volume or weight of substrate from a distributor, such as a home and garden store, a nursery, or a greenhouse. The pre-defined volume or weight will typically be in the form of a package containing the substrate, but may be in any of a number of other forms, including, but not limited to, a container suitable for growing a plant.

As used herein, a container is anything that can be used to contain the substrate of the invention and a plant. Thus, a container can be a pot, bag, box, cup, and the like. Typically, the container will be a pot or other item that is used in the art to grow plants and maintain living plants in homes or businesses. The containers may be made of any material that is suitable for holding the substrate and a plant. Examples include, but are not limited to, plastic, clay or clay products, wood, concrete, plaster, metal, and glass. Such pots and the material they are made from are well known to the average person, and need not be detailed any further herein.

In embodiments, the substrate is provided in the container before the plant, whereas in others, the substrate is provided after the plant is contained in the container. That is, when a person wishes to plant a plant already having a root system, that person may place part or all of the root system in the container and add the substrate around the root system such that at least part of the substrate contacts at least part of the root system, or may add substrate to the container then place at least a portion of the root system into the container such that at least a portion of the root system contacts the substrate.

Various other activities that can be included within the step of providing are envisioned by the invention. Some such activities are discussed above with respect to the substrate itself and the methods of making the substrate, and many others will be apparent to those of skill in the art from reading and considering the present disclosure in view of the state of the art.

The method of growing a plant comprises contacting the plant with the substrate of the invention. Contacting can be accomplished by any known technique, including, but not limited to those discussed above. Contacting can also be accomplished by placing, laying, or otherwise bringing the plant into physical contact with the top surface of the substrate or by embedding the plant in the substrate. This particular embodiment of the invention is typically practiced when the plant is in the form of a seed.

As is evident from the above disclosure, by plant it is meant any form of a plant that is capable of growing and living. Thus, a plant may be a seed, seedling, cutting, sapling, or full-grown plant. A plant according to the invention may be any organism that is classified, under any classification scheme, as a plant. The term includes, without limitation: monocotyledons or dicotyledons; seed bearing, spore bearing, or runner bearing plants; deciduous or coniferous plants; hardwood or softwood plants; and annuals or perennials. Accordingly, a plant according to the invention can be a fruit, a vegetable, an agricultural crop, an ornamental, a flowering plant, a shrub, a vine, a grass, a bulb, a corm, or a tree. Non-limiting examples of plants according to the present invention include tomatoes, azalea, holly, juniper, rhododendron, boxwood, nandina, crepe myrtle, maple, oak, dogwood, magnolia, crabapple, begonia, impatien, marigold, petunia, pansy, chrysanthemum, geranium, daylily, ornamental grasses, hosta, poinsettia, orchid, African violet, and roses.

The methods of growing plants can also include maintaining the plant in contact with the substrate for a sufficient amount of time for the plant to grow or live. By grow, it is meant increase in size or mass an amount that is detectable. This is in contrast to the terms live and maintain (used interchangeably herein), which are used to indicate that the plant performs sufficient metabolic processes to remain alive, even though there is no increase in plant size or mass. This amount of time will vary from plant to plant and application to application. However, when the plant is a seed, it is generally an amount of time necessary for the seed to germinate and develop a root system that is capable of maintaining the plant. In general, the amount of time that the plant is maintained in contact with the substrate may be weeks, months, or years.

The methods may further include adding additional substances to the substrate, plant, or both before, during, or after contacting the plant and substrate. For example, the method may include adding one or more nutrients to the substrate to maintain a balanced nutrient profile for growth and/or maintenance of the plant. It may also include adding more substrate to the container containing the plant and substrate. More specifically, because the substrate is predominantly wood, and because wood will decompose over time, the amount of substrate in the container may decrease over time. Under such circumstances, it might be desirable to either re-pot the plant in new substrate or add more substrate to the container in which the plant is currently growing. Interestingly, however, it has been recognized that wood chips are somewhat resistant to decay, and require no composting prior to use. There is little or no shrinkage of substrates comprising high levels of wood chips for short term crops up to 6 to 8 months. Likewise, because there is little or no decomposition of the wood during short production periods, there is little or no loss of nitrogen due to its use in the decomposition process, and thus no need to supplement the wood chips substrate with nitrogen.

In addition, the location of the plant might change from one room to another, or from outside to inside. The change in environment might render the color of the substrate undesirable. Accordingly, the plant may be removed from the substrate and place in another substrate of a more appropriate color, or additional substrate of an appropriate color may be added to the top of the original substrate, thus masking the old color and providing a new color.

Thus the method of growing a plant can further comprise watering the plant or providing food and nutrients one or more times throughout the life of the plant.

The method of growing a plant can comprise growing the plant until an edible portion is produced. In such a case, the method of growing a plant is also a method of growing food. The method can include harvesting the food. Likewise, it can comprise supplying the food for consumption by a human or animal.

In view of the fact that the method of growing a plant may result in a viable, healthy plant that may have desirable qualities (e.g., production of flowers or edible fruit), the method of growing can include selling the plant or a portion of the plant, such as a fruit from the plant.

It is preferred to maintain nutritional levels of the substrate at suitable levels throughout the growing and/or maintenance of the plant. Thus, the method of growing a plant can include monitoring and/or adjusting the levels of the substrate or one or more substances comprising the substrate. Water, nutrients, the volume of substrate, and any other substance or characteristic of the substrate can be monitored and/or adjusted.

Suitable growing and maintenance nutritional levels are known in the art, and any such levels may be used within the methods of this aspect of the invention. For example, the following ranges are appropriate for woody perennial plants with medium to high nutritional requirements (using the Virginia Tech extraction method (pour-through method)), using solution fertilization with controlled release fertilizer: pH of 5.0–6.0; electrical conductivity of 0.5–1.0 dS/cm; nitrate concentration of 50–100 mg/l; phosphorous concentration of 1–15 mg/l; potassium concentration of 10–50 mg/l; calcium concentration of 2–40 mg/l; magnesium concentration of 1.5–20 mg/l; manganese concentration of 0.001–0.3 mg/l; iron concentration of 0.05–0.5 mg/l; zinc concentration of 0.005–0.2 mg/l; copper concentration of 0.001–0.02 mg/l; boron concentration of 0.025–0.075 mg/l; molybdenum concentration of 0.001–0.020 mg/l; aluminum concentration of 0.1–0.5 mg/l. Levels for herbaceous perennials are 2–3 times higher for N, P, K, Ca, and Mg, with micro-nutrients being about the same. The concentrations of a specific embodiment of the invention are given in Table 4, below. Of course, these ranges can be easily adjusted based on the particular plant, the season, the age of the plant, and numerous other factors. Other suitable conditions are known to those of skill in the art and need not detailed here.

In a further application of the method of growing a plant, the present invention provides for the use of the substrate of the invention to grow a plant. The substrate can be used to grow a plant from any stage of development, such as from seed, and can include maintaining a living, viable plant in that state for an amount of time.

It is evident that the present invention provides a method of growing a plant. In general, the method comprises providing a plant, and contacting the plant with a substrate comprising wood chips having a range of sizes from about 0.05 mm or less to about 10 mm or more, wherein at least 0.5% of the wood chips have a size of 0.05 mm or less. The method can further comprise adding additional substances to the substrate, before, at the time of, or after contacting the plant and substrate. The plant can be at any stage of growth, including a seed. The plant can be any plant, such as a holly, a marigold, a tomato, a chrysanthemum, or an azalea. The method can further comprise harvesting food or flowers from the plant.

EXAMPLES

The invention will now be further described by way of examples of various non-limiting embodiments of the invention. The following Examples are provided to give additional guidance with regard to certain embodiments, and are not to be considered as limiting the invention in any way.

Example 1

Preparation of a Substrate

Wood chips were produced by grinding a 17 m long by 25 cm basal diameter loblolly pine (*Pinus taeda* L.) log (including the bark) with a Morbark Chipper (Winn, Mich.) operated at Wood Preserver, Inc, Warsaw, Va. to create pine chips (PC). These types of chips are routinely produced by the forestry industry and used for paper manufacturing or as energy source at power plants. Chip size was reduced further with a Crary Bear Cat chipper (West Fargo, N. Dak.) to a particle size suitable for a container substrate (Table 3). Ground, aged loblolly pine bark (PB; a conventional PB substrate) was used as a second substrate and blended with PC for a third substrate.

TABLE 3

Particle analysis of the three different container substrates used in this study.

| Particle size range (mm) | Pine Bark (PB) | Pine Chips (PC) | 75% PC/25% PB |
|---|---|---|---|
| >12.5 | 0.3[z] | 0 | 0 |
| 6.3 | 9.2 | 0.4 | 2.7 |
| 4.75 | 8.4 | 1.2 | 3.7 |
| 2.36 | 28.8 | 56.0 | 49.5 |
| 2 | 2.8 | 1.3 | 1.5 |
| 1.4 | 9.6 | 9.4 | 8.9 |
| 0.71 | 15.1 | 21.4 | 18.8 |
| 0.5 | 6.2 | 3.5 | 4.7 |
| 0.355 | 5.1 | 2.2 | 3.1 |
| 0.25 | 4.0 | 1.5 | 2.3 |
| 0.177 | 3.4 | 1.0 | 1.7 |
| 0.125 | 1.8 | 0.5 | 0.9 |
| 0.09 | 1.6 | 0.4 | 0.7 |
| 0.063 | 1.1 | 0.2 | 0.4 |
| 0 | 1.4 | 0.1 | 0.4 |

[z]Data represent means of 3 samples.

Example 2

Use of a Substrate to Grow Potted Plants

Due, at least in part, to uncertainties of future supplies of pine bark (PB) and peat moss, the suitability of ground *Pinus taeda* logs (pine chips or PC) as a substrate for growth of plants was tested. More specifically PC were compared to ground PB as a potential container substrate for Japanese holly (*Ilex crenata* Thunb.'Chesapeake'), azalea (*Rhododendron obtusum* Planch. "Karen"), and marigold (*Tagetes erecta* Big. "Inca Gold"). The three plant species were potted in early spring in 2.8 liter plastic containers with the following substrates: 100% PB, 100% PC, and a mixture of 75% PC to 25% PB. Osmocote Plus (Grace-Sierra Horticulture Products, Marysville, Ohio) at 7.5 kg/m$^3$ for holly and marigold and 5 kg/m$^3$ for azalea were pre-plant incorporated into each substrate. Initially the substrate solution EC levels of the PC treatments were lower than PB, therefore PC treatments received occasional fertilizer applications in the irrigation water (300 ppm N from $NH_4NO_3$) 45 ppm P from $H_3PO_4$, and 150 ppm K from KCl) to maintain the PC EC readings near those of the PB. The plants were glasshouse grown 8 weeks for marigold and 13 weeks for holly and azalea. After growth, the above-ground portion of the plants were harvested and dried. The roots were independently harvested and dried.

The experimental design was completely randomized with six plants per treatment. One week after planting, substrate solutions were extracted from 6 unfertilized fallow containers with either 100% PB or 100% PC using the pour-through method (Wright, 1986). Two weeks after planting, substrate solutions were extracted from 6 containers for each of the three substrates that had been planted and fertilized. Substrate solution nutrient concentrations using ICAP analysis as well as pH and EC were determined. Electrical conductivity and pH readings were taken periodically during the experimental period.

Eight weeks after planting, marigold shoots were severed at the substrate surface, dried at 70° C. for 4 days, and weighed. Thirteen weeks after planting, azalea and holly shoots were severed at the substrate surface, dried at 70° C. for 3 days, and weighed. Holly roots were separated from the substrate, dried, and weighed. Due to the very thin roots of azaleas and marigolds separating roots from substrate resulted in losing a large percentage of the roots, thus no root weights of azalea and marigold were taken.

Physical properties of each substrate were determined according to Tyler, et al. (1993a) on four replicate samples removed from four azalea containers at the end of the experiment. Data were subjected to analysis of variance and mean separation by Duncan's multiple range test (Statistical Analysis Systems, Cary, N.C. Release 8.2).

Marigold shoot dry weight was the same for 100% PB and the mixture of 75% PC to 25% PB, both being higher than 100% PC. Azalea shoot dry weight was higher in 100% PB than both substrates containing chips (FIG. 1). While shoot dry weight for azalea and marigold was less in PC compared to PB, the overall visual quality of the plants grown in PC was acceptable. There was no difference in shoot dry weight for Japanese holly between the three substrates.

Figure 2:
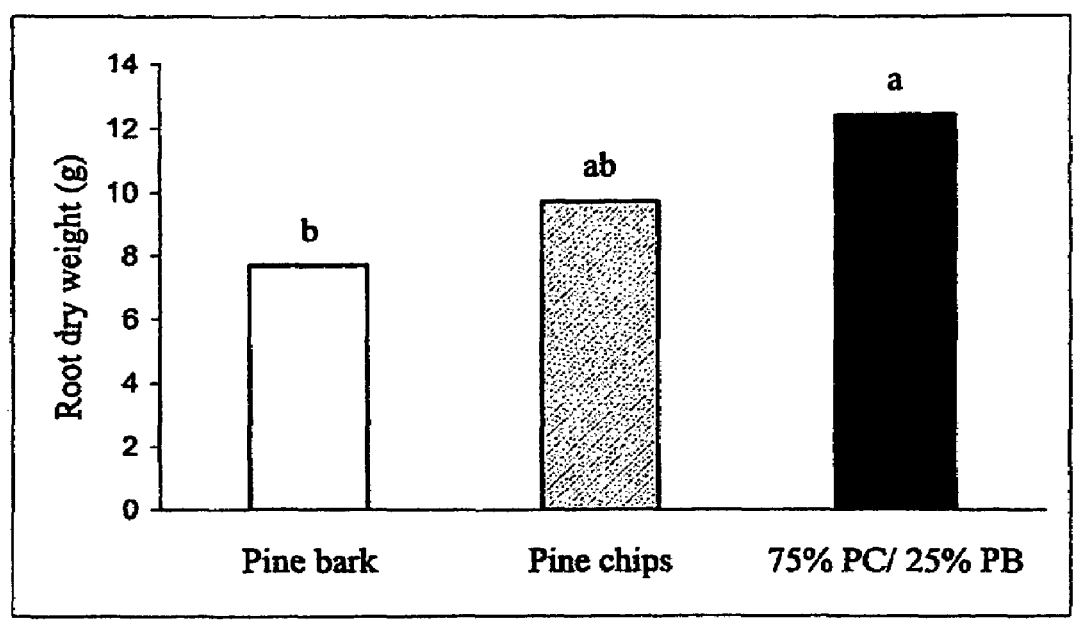
FIG. 2 depicts root dry weight of Japanese holly grown in three different substrates. Treatments with the same letter above bars are not significantly different (P<0.05); Duncan's multiple range test.

Root dry weight was higher for the mixture of 75% PC to 25% PB than for 100% PB, but root weight of 100% PB and 100% PC was the same (FIG. 2). Visual observations of azalea and marigold root balls indicated that root growth in the PC was at least comparable, if not better, to root growth for PB (data not shown).

Analysis of the substrate solution from fallow containers for PC and PB showed minor differences in pH and no difference in EC (Table 4). There were differences in levels of various nutrients but none that caused concern in terms of the suitability of pine chips as a container substrate. The percent air space for the PC was higher than the PB substrate but container capacity and available water was not different for the three substrates. During the course of the study the substrate solution EC of the PC tended to be lower than that for PB, possibly due to greater leaching with the more porous PC and nutrient retention by the PC. An attempt to maintain the substrate solution EC for the PC was made by providing weekly applications of fertilizer through the irrigation, but in some cases like azalea the EC was still lower for PC after 7–8 weeks (Table 5). This lower EC could partially account for the lower shoot dry weight for azalea grown in PC (FIG. 1). The lower EC of the PC could be due to PC retaining more nutrients than PB. Prasad (1980) demonstrated that substrates with high portions of sawdust and wood shavings, in some ways similar to the ground PC of the present example, retain more nutrients than substrates such as peat moss, resulting in lower levels in solution. Also, the tendency for the PC to have lower EC could in part be due to more leaching of nutrients during irrigation due to the PC being more porous.

TABLE 4

Substrate solution pH, EC, and nutrient concentrations for pine bark and freshly ground pine chips one week after planting and before fertilization. Data represent means of 6 containers.

| Substrate | pH | EC dS/cm | P | K | Ca | Mg | Cu | Fe | Mn | Zn | B | Mo | Al |
|---|---|---|---|---|---|---|---|---|---|---|---|---|---|
| | | | | | | | mg/l | | | | | | |
| Pine bark (PB) | 5.9 a[z] | 0.11 a | 0.6 b | 21.0 a | 3.6 a | 2.0 b | 0.003 a | 0.07 b | 0.398 a | 0.031 a | 0.029 b | 0.005 a | 0.12 b |
| Pine chips (PC) | 5.7 b | 0.09 a | 2.7 a | 17.3 a | 3.5 a | 3.0 a | 0.004 a | 0.12 a | 0.004 b | 0.016 b | 0.049 a | 0.006 a | 0.31 a |

[z]Means were separated using Duncan's Multiple Range Test ($P < 0.05$). Treatments with the same letters are not significantly different.

TABLE 5

Substrate solution pH and EC for three species in three different container substrates at eight weeks after planting. Data represent means of 6 containers.

| | Marigold | | Azalea | | Japanese Holly | |
|---|---|---|---|---|---|---|
| Substrate | pH | EC (dS/cm) | pH | EC (dS/cm) | pH | EC (dS/cm) |
| Pine bark (PB) | 4.9 a[z] | 2.2 a | 4.9 c | 1.4 a | 4.8 b | 1.6 a |
| Pine chips (PC) | 5.0 a | 1.8 a | 6.4 b | 0.5 b | 5.0 b | 1.6 a |
| 75% PC/25% PB | 4.9 a | 2.3 a | 6.6 a | 0.5 b | 5.3 b | 1.9 a |

[z]Means were separated using Duncan's Multiple Range Test ($P < 0.05$). Treatments with the same letters are not significantly different.

The particle size analysis of the substrates revealed that the PC were coarser than PB, having a much larger percent of the particles above 0.5 mm (Table 3). As well, the air space following irrigation and drainage was 40% for PC versus 15.6% for PB (Table 6). Container capacity (the gravimetric water present after irrigation and drainage), was not different between the three substrates. There was also no difference in the percent available water between PC and PB, indicating that the water present in PC is equally available for plant use as with PB.

It was concluded that the amount of water available to the plant with PC could be increased considerably by increasing the amount of particles 0.5 mm and below, either by further grinding of the PC or adding a substrate such as finely ground peat moss, compost, or finely ground PB to increase container capacity. This could be accomplished without compromising the percent air space, which was at 40 percent for PC—well above an acceptable range of 15–25 percent—and without being a detriment to plant growth. Another favorable quality of PC observed during the course of this study was that no noticeable shrinkage of the substrate due to microbial decomposition occurred.

In other experiments (not shown), it has been noted that the addition of minor amounts of clay to the PC improves growth in some situations.

Nutrient analysis of the substrate solution indicated that there are no toxic nutrient levels associated with PC. The pH of PC is also acceptable for plant culture. As well, there was no apparent shrinkage due to decomposition during the course of the experiment. Pine chips, therefore, offer potential as a container substrate for greenhouse and nursery crops.

TABLE 6

Physical and hydraulic properties of three different container substrates. Data were collected from 4 containers per treatment and represented as means.

| Substrate | Total porosity[z] (TP) | Air space[y] (AS) | Container Capacity[x] (CC) | Available water[w] (AW) | Unavailable water[v] (UW) | Bulk density (BD) |
|---|---|---|---|---|---|---|
| | | | (% vol) | | | (g/cc) |
| Pine bark (PB) | 70 c[u] | 15.6 c | 54.4 a | 27.9 a | 26.6 a | 0.25 a |
| Pine chips (PC) | 88.6 a | 40 a | 48.6 a | 25.1 a | 23.6 b | 0.16 b |
| 75% PC/25% PB | 82.8 b | 31.2 b | 51.6 a | 26.6 a | 25.0 ab | 0.17 b |

[u]Means were separated using Duncan's Multiple Range Test ($P < 0.05$).

Results from this study demonstrate the feasibility of growing greenhouse and nursery crops in a substrate comprised primarily of whole pine logs. While plant growth was less in some cases for the PC, we believe that by reducing the porosity and increasing the water holding capacity of PC, as well as proper nutritional and irrigation management, ground PC can substitute for or even exceed the quality of a combination of PB and peat moss in container substrates.

Example 3

Use of a Substrate to Grow Poinsettias

The previous Example demonstrated that pine chips are an effective substrate for growing woody (azaleas and holly) or herbaceous plants (marigold). The following is a summary of experiments further investigating the effectiveness of pine chips as a container plant growing substrate. An experiment was conducted to determine if pine chips are an effective substrate for growing poinsettia, the most popular greenhouse potted plant in the U.S.

Figure 3:
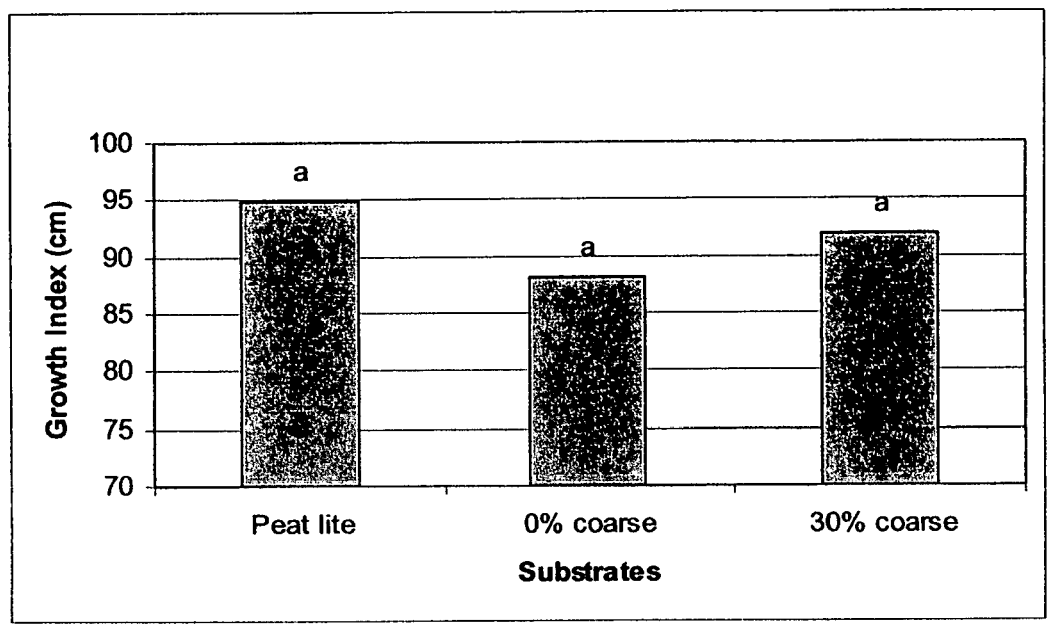
FIG. 3 depicts the growth index of poinsettia grown in peat lite and pine chips. Bars with same letter are not statistically different from one another. P=0.05.
Figure 4:
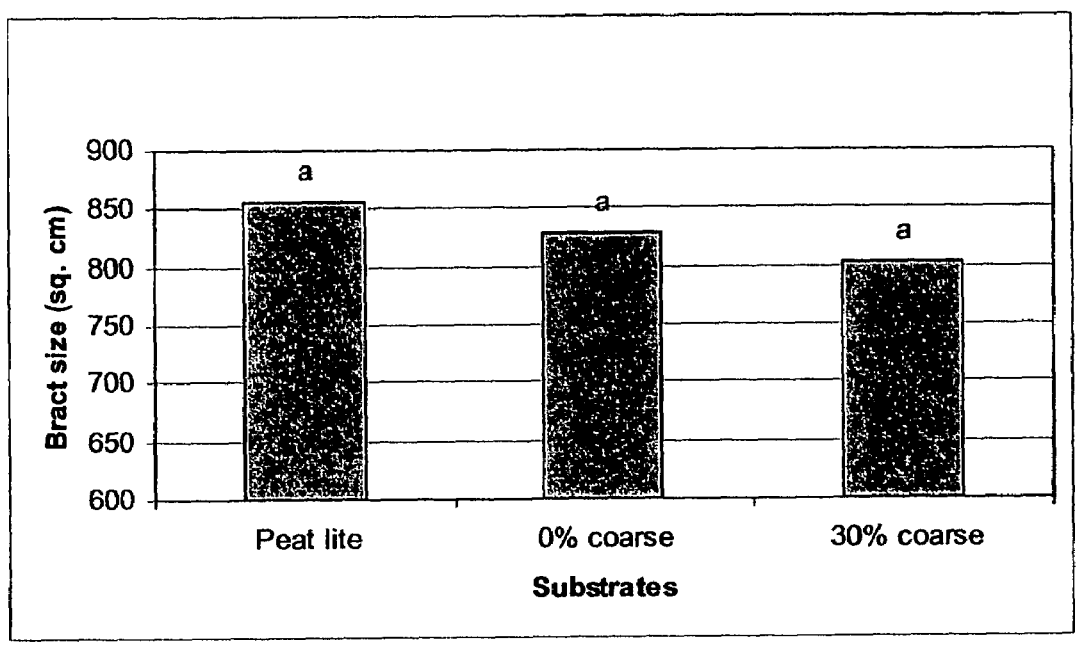
FIG. 4 depicts poinsettia bract size of plants grown in peat lite and pine chips. Bars with same letter are not statistically different from one another. P=0.05.

Eight rooted cuttings of poinsettia were potted in each of three substrates and grown about 3 and one-half months. The three substrates were as follows: commercial peat lite (peat lite is equivalent to a standard commercial mix used extensively in the greenhouse industry), pine chips produced with a knife ring flaker (see Table 2, second column, above). Plants were fertilized with a 20-10-20 fertilizer in the irrigation water at a rate of 200 ppm N as irrigation was needed. At the end of the experiment the plant growth index was determined by taking two perpendicular width measurements of the plant canopy as well as plant height. The two width measurement were summed, divided by two and added to plant height. Bract size was determined by taking the three largest inflorescences on each plant, measuring the length and width of the three largest bracts of each inflorescence and calculating the average bract size (square cm) for each plant. Data in FIGS. 3 and 4 demonstrate that there are no statistical difference between plants grown in chips and the commercial mix normally used for poinsettia. Thus, a substrate of the present invention can not only support growth of container plants, but there is no statistical difference in the growth of the plants on the substrate of the invention and a common substrate widely used in the art to grow container plants.

Example 4

Growth of Marigolds in a Substrate of the Invention

Figure 5:
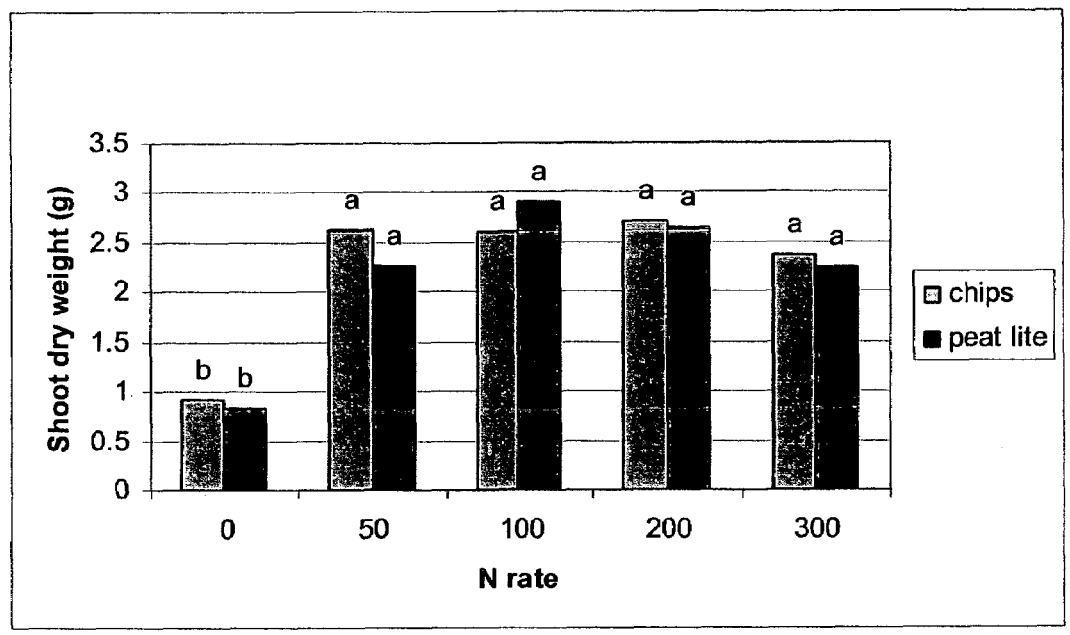
FIG. 5 depicts the effect of Nitrogen rate on shoot dry weight of marigolds grown in peat lite or pine chips. Bars within each substrate across Nitrogen rate with same letter are not statistically different from one another. P=0.05.
Figure 6:
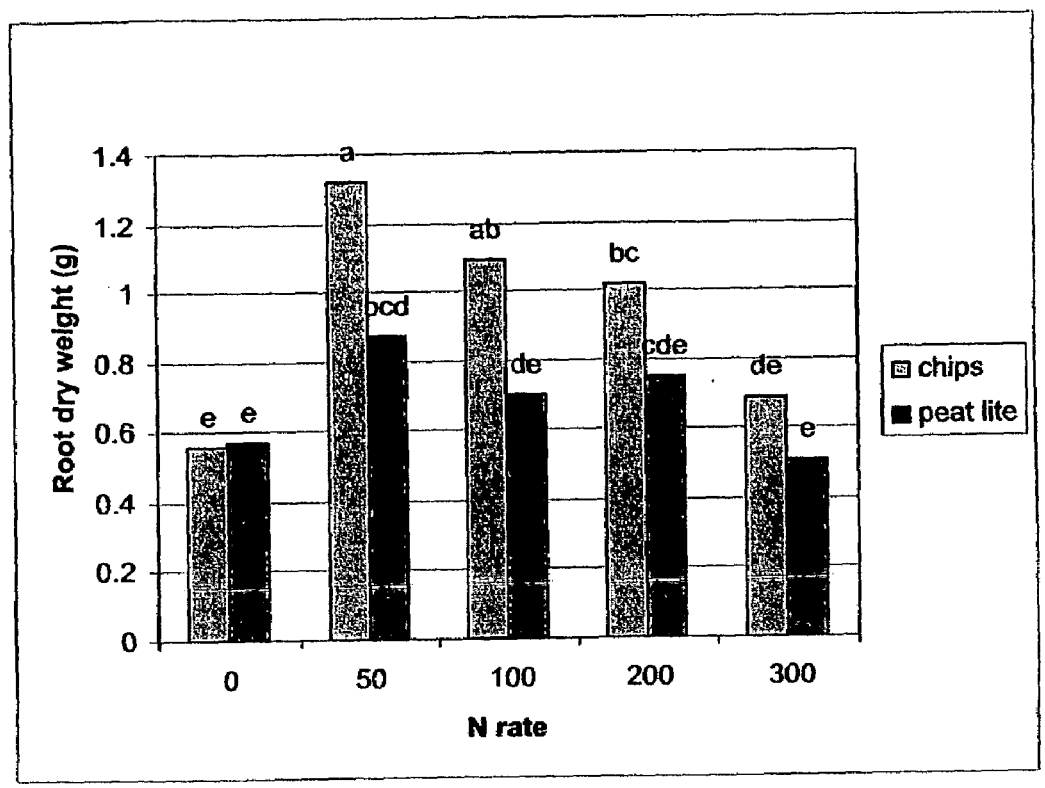
FIG. 6 shows the effect of Nitrogen rate on root dry weight of marigold grown in peat lite or pine chips. Bars within each substrate across Nitrogen rate with same letter are not statistically different from one another. P=0.05.

Further experiments were conducted with marigold to evaluate the effectiveness of chips as a substrate. Three-week old marigold seedlings were transplanted in quart containers containing either peat lite or pine chips. A 20-10-22 fertilizer was injected in the irrigation water with each irrigation at the following rates based upon ppm N: 0, 50, 100, 200, 300, and 400. Eight plants per treatment were utilized. Plants were greenhouse grown and harvested after three weeks by separating shoot from roots, drying, and weighing. Shoot dry weight increased with increasing N rate similarly for both peat lite and pine chips (FIG. 5), whereas root dry weights were somewhat larger for pine chips (FIG. 6). This demonstrates that additional nitrogen is not required for the substrate of the present invention to obtain satisfactory shoot growth.

Example 5

Evaluation of a Substrate on Shoot and Root Growth

Figure 7:
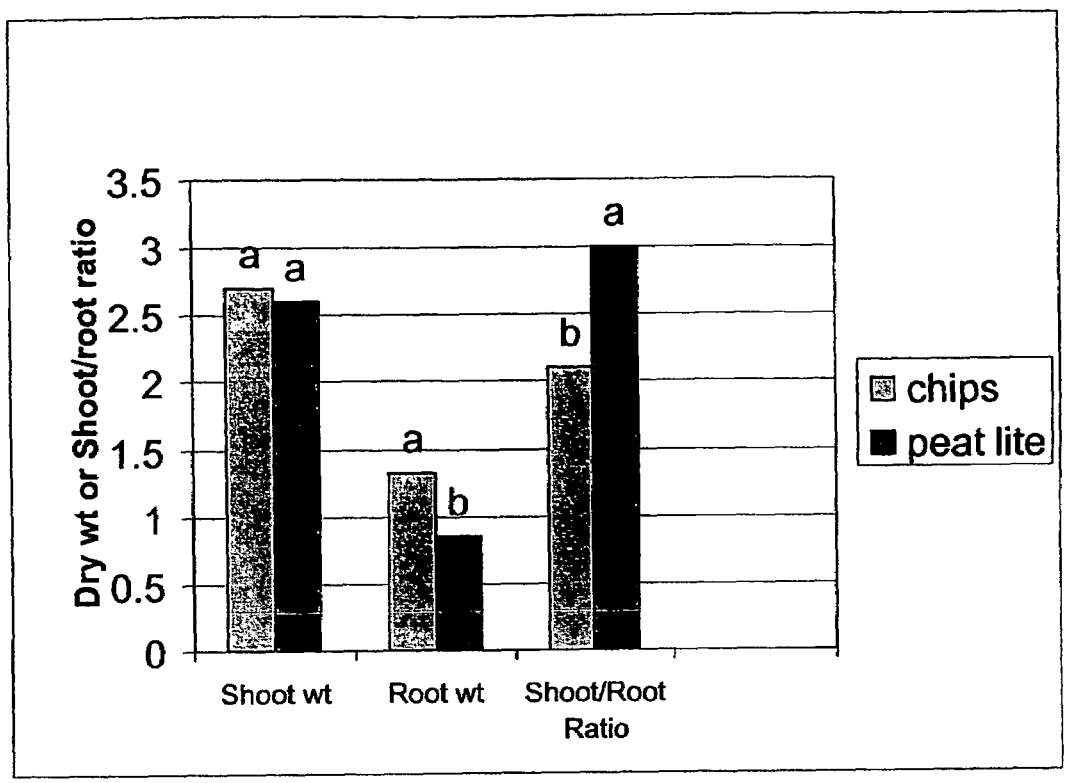
FIG. 7 depicts shoot and root dry weight and shoot/root ratio of quart size marigolds as influenced by peat lite and pine chips. Bars with same letter are not statistically different from one another. P=0.05.

To evaluate the effect that the substrate had on shoot/root ratio, the plants exemplified in Example 4 were further analyzed. The shoot dry weight at 50 ppm N was divided by the root dry weight at 50 ppm N. As can be seen from FIG. 7, the shoot weight between PC-grown and peat lite-grown marigolds was insignificantly different. However, the root growth was significantly better in PC, resulting in a more favorable (lower) shoot/root ratio for PC-grown marigolds. A lower shoot/root ratio (FIG. 7) for the chips demonstrates that plants grown in pine chips have a more favorable (lower) shoot/root ratio and would be better suited for transplanting and survival.

Figure 8:
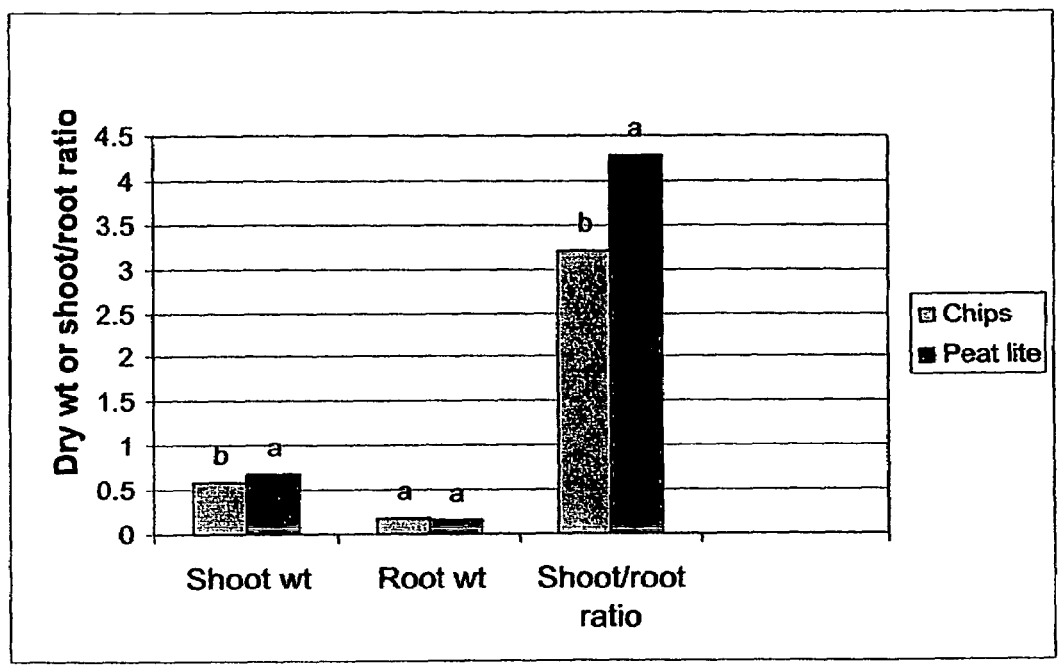
FIG. 8 depicts the shoot and root dry weight and shoot/root ratio of marigold grown in cell packs. Bars with same letter are not statistically different from one another. P=0.05.

An additional experiment was performed to evaluate the effect of the substrate on growth of germinating seedlings. In this experiment, marigold seeds were inserted slightly under the surface of the two substrates in cell packs containing six 3 cm diameter cells. Six 6 cell units were utilized for each substrate. Three weeks later, plants were harvested, dried and weighed. As can be seen in FIG. 8, shoot weight was slightly larger for the peat lite substrate, but there was no significant difference in root weight. However the shoot/root ratio was again more favorable (lower) for the pine chips than the commercial peat lite substrate. These results confirm that pine chips are an excellent germination mix and support rapid growth of germinating seedlings.

The results presented in Examples 4 and 5 show that the substrate of the present invention provides better root growth than a widely used substrate known in the art. Accordingly, use of a substrate of the present invention will eliminate the need to spray plants to retard shoot growth, which is a common and costly practice that must be performed to get a suitable shoot/root ratio.

Example 6

Requirement for Lime in Substrates of the Invention and Art

It is known in the art that PB and peat-based substrates require addition of lime to make them suitable for growth of plants (by increasing pH). An experiment was conducted to determine if additions of limestone are required for wood chips according to the invention as well.

Figure 9:
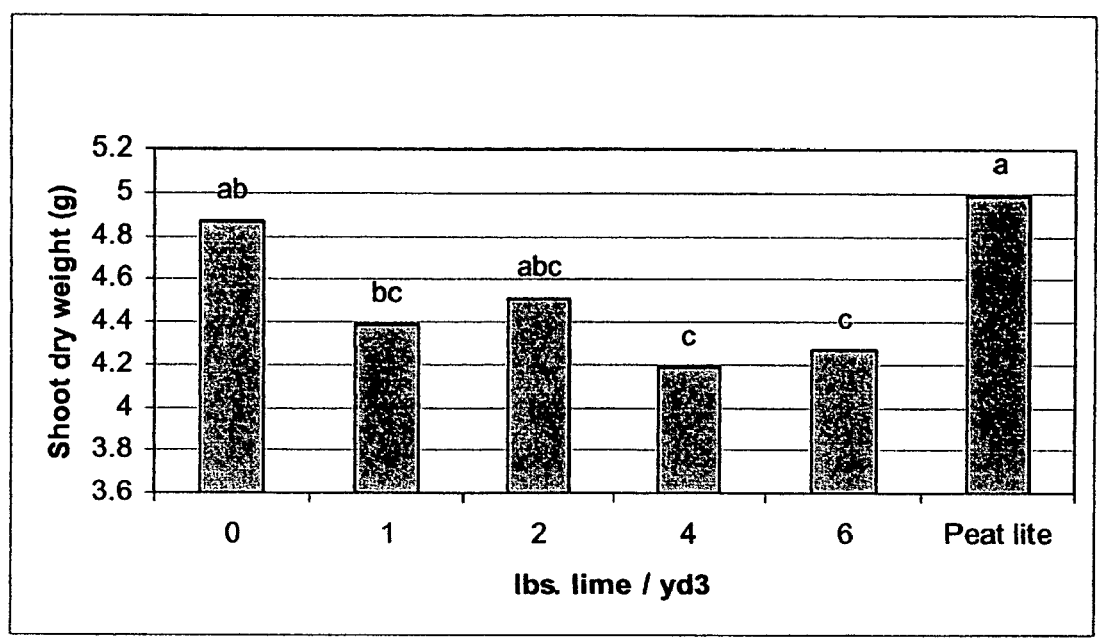
FIG. 9 shows the effect of dolomitic limestone rate on growth of marigold in pine chips compared to a peat lite control. Bars with same letter are not statistically different from one another. P=0.05.

Varying amounts of dolomitic limestone (0, 1, 2, 4, and 6 lbs/cu. yd.) were incorporated into pine chips and marigolds were grown on the substrates. Growth was compared to plants growing in a commercial peat lite substrate (FIG. 9, last column). As can be seen in FIG. 9, marigold plant dry weights after three weeks demonstrated that adding limestone, at any rate, to pine chips does not increase growth as with other substrates, such as peat-based substrates. Indeed, the data indicate that the pH of the substrate of the invention, as produced, is at least as good for growth of marigolds as pH levels when adjusted upward with addition of lime. FIG. 9 further shows that shoot growth in pine chips is equivalent to growth in a peat lite substrate.

It will be apparent to those skilled in the art that various modifications and variations can be made in the practice of the present invention without departing from the scope or spirit of the invention. Other embodiments of the invention will be apparent to those skilled in the art from consideration of the specification and practice of the invention. It is intended that the specification and examples be considered as exemplary only.

LITERATURE CITED

Bugbee, G. J., C. R. Frink, and D. Migneault. 1991. Growth of perennials and leaching of heavy metals in media amended with a municipal leaf sewage sludge and street sand compost. J. Environ. Hort. 9:47–50.

Chong, C. and G. P. Lumis. 2000. Mixtures of paper mill sludge, wood chips, bark, and peat in substrates for pot-in-pot shade tree production. Plant Sci. 80:669–675.

Dueitt, S., J. Howell, and S. E. Newman. 1993. Rice hulls as a vermiculite substitute in peat-based media for growing greenhouse bedding plants. SNA Proceedings 38:62–63.

Ehret, D. L., B. J. Zebarth, J. Portree, T. Garland. 1998. Clay addition to soilless media promotes growth and yield of greenhouse crops. HortScience 33:67–70.

Kahtz, A. W. and N. J. Gawel. 2004. Growth of barberry liners in media amended with noncomposted recycled waste. HortTechnology 14:192–195.

Lunt, O. R. and B. Clark. 1959. Bark and wood fragments. Forest Prod. J. 9:39a–42a.

Owings, A. D. 1993. Cotton gin trash as a medium component in production of 'Golden Bedder' coleus. SNA Proceedings 38:65–66.

Pokorny, F. A. and H. Y. Wetzstein. 1984. Internal porosity, water availability, and root penetration of pine bark particles. HortScience 19:447–449.

Prasad, M. 1980. Retention of nutrients by peats and wood wastes. Scientia Hort. 12:203–209.

Rosen, C. J. T. R. Halbach, and B. T. Swanson. 1993. Horticultural uses of municipal solid waste composts. HortTechnology 3:167–173.

Tyler, Helen H., Stuart L. Warren, Ted E. Bilderback, and William C. Fonteno. 1993a. Composted turkey litter: I. Effect on chemical and physical properties of a pine bark substrate. J. Environ. Hort. 11: 131–136.

Tyler, Helen H., Stuart L. Warren, Ted E. Bilderback, and Katherine B. Perry. 1993b. Composted turkey litter: II. Effect on plant growth. J. Environ. Hort. 11:137–141.

Wright, R. D. 1986. The pour-through nutrient extraction procedure. HortScience 21:227–229.

The invention claimed is:

1. Wood chips having a range of sizes from about 0.05 mm or less to about 10 mm or more, wherein at least 0.5% of the wood chips have a size of 0.05 mm or less.

2. A substrate for growing plants, said substrate comprising the wood chips of claim 1.

3. The substrate of claim 2, wherein the wood chips comprise a majority of the volume of the substrate.

4. The substrate of claim 2, wherein the substrate comprises wood chips from a single species of plant.

5. The substrate of claim 2, wherein the substrate comprises wood chips from two or more species of plants.

6. The substrate of claim 2, further comprising one or more substances.

7. The substrate of claim 6, wherein the substance comprises nitrogen, carbon, phosphorous, potassium, sulfur, calcium, magnesium, copper, iron, manganese, zinc, boron, molybdenum, aluminum, nickel, water, or a combination of two or more of these substances.

8. The substrate of claim 6, wherein the substance is a colorant.

9. A method of growing a plant, said method comprising
providing a plant, and
contacting the plant with a substrate comprising wood chips having a range of sizes from about 0.05 mm or less to about 10 mm or more, wherein at least 0.5% of the wood chips have a size of 0.05 mm or less.

10. The method of claim 9, further comprising adding additional substances to the substrate, before, at the time of, or after contacting the plant and substrate.

11. The method of claim 9, wherein the plant is a seed.

12. The method of claim 9, wherein the plant is a holly, a marigold, a tomato, a chrysanthemum, a poinsettia, or an azalea.

13. The method of claim 9, further comprising harvesting food or flowers from the plant.

14. The substrate of claim 2, wherein 60% or more, by volume, of the substrate comprises the wood chips, and less than 40% of the substrate, by volume, comprises bark or other non-wood parts of a plant.

15. The substrate of claim 14, wherein 70% or more, by volume, of the substrate comprises wood chips.

16. The substrate of claim 14, wherein 80% or more, by volume, of the substrate comprises wood chips.

17. The substrate of claim 14, wherein 90% or more, by volume, of the substrate comprises wood chips.

18. The substrate of claim 14, wherein 95% or more, by volume, of the substrate comprises wood chips.

19. The substrate of claim 14, wherein 98% or more, by volume, of the substrate comprises wood chips.

20. The substrate of claim 14, wherein 99% or more, by volume, of the substrate comprises wood chips.

21. The substrate of claim 14, wherein 99.5% or more, by volume, of the substrate comprises wood chips.

* * * * *